(12) United States Patent
Mojaver

(10) Patent No.: US 10,148,916 B2
(45) Date of Patent: *Dec. 4, 2018

(54) COMPOUND DOME CAMERA ASSEMBLY

(71) Applicant: Epilog Imaging Systems, San Diego, CA (US)

(72) Inventor: Michael Mojaver, Poway, CA (US)

(73) Assignee: Epilog Imaging Systems, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/338,694

(22) Filed: Oct. 31, 2016

(65) Prior Publication Data
US 2017/0064255 A1    Mar. 2, 2017

Related U.S. Application Data

(63) Continuation of application No. 13/276,686, filed on Oct. 19, 2011, now Pat. No. 9,485,395.

(51) Int. Cl.
| | |
|---|---|
| *H04N 7/18* | (2006.01) |
| *H04N 5/225* | (2006.01) |
| *G03B 5/00* | (2006.01) |
| *G03B 37/02* | (2006.01) |
| *G03B 37/04* | (2006.01) |
| *H04N 5/232* | (2006.01) |

(52) U.S. Cl.
CPC .............. *H04N 7/181* (2013.01); *G03B 5/00* (2013.01); *G03B 37/02* (2013.01); *G03B 37/04* (2013.01); *H04N 5/2251* (2013.01); *H04N 5/2259* (2013.01); *H04N 5/23238* (2013.01); *G03B 2205/0046* (2013.01); *H04N 7/18* (2013.01)

(58) Field of Classification Search
CPC combination set(s) only.
See application file for complete search history.

(56) References Cited

U.S. PATENT DOCUMENTS

| | | | |
|---|---|---|---|
| 6,061,087 A | 5/2000 | Schieltz et al. | |
| 6,215,519 B1 | 4/2001 | Nayar et al. | |
| 7,963,707 B2 | 6/2011 | Jung et al. | |
| 2001/0022627 A1 | 9/2001 | Bernhardt | |
| 2003/0071891 A1* | 4/2003 | Geng | H04N 5/2259 348/39 |
| 2006/0028548 A1* | 2/2006 | Salivar | G08B 13/19643 348/143 |
| 2012/0217356 A1* | 8/2012 | Park | G08B 13/19619 248/122.1 |
| 2013/0050495 A1* | 2/2013 | Chen | H04N 7/183 348/151 |
| 2015/0271453 A1* | 9/2015 | Chuang | H04N 7/181 348/39 |

FOREIGN PATENT DOCUMENTS

| | | |
|---|---|---|
| CN | 101511005 A | 8/2009 |
| EP | 1579399 A2 | 9/2005 |

* cited by examiner

*Primary Examiner* — Janese Duley
(74) *Attorney, Agent, or Firm* — Reza Mollaaghababa; Thomas J. Engellenner; Pepper Hamilton LLP

(57) ABSTRACT

In one aspect, the invention provides an imaging system adapted to simultaneously receive light from wide and narrow fields of view, with the wide filed image data collected by an array of fixed position cameras, and the narrow field data collected by a panable, tiltable room camera at higher resolution than the fixed array in a selected orientation, and a compound viewing cover that includes two separated pieces interlocked with one another.

8 Claims, 5 Drawing Sheets

COMPOUND DOME CAMERA ASSEMBLY

RELATED APPLICATION

The present application is a continuation of U.S. patent application Ser. No. 13/276,686, filed Oct. 19, 2011, which is incorporated herein by reference in its entirety.

TECHNICAL FIELD

The present invention is generally directed to video surveillance and more particularly, to systems containing multiple fixed cameras in conjunction with a panable, tiltable zoom camera with a compound viewing cover.

BACKGROUND

Imaging systems are employed in a variety of applications. For example, in surveillance applications, imaging systems can provide still or video images of a field of view, and in some cases, such systems can detect changes in the field of view, e.g., movement of a vehicle, a person or fire and smoke.

When covering a relatively large area, for example in me order of an acre in size, it may be advantageous to obtain wide field imagery concurrent with detailed zooms of specific areas of interest, for example based on motion to identify people and vehicles.

To achieve above, some surveillance systems use multiple cameras in a single enclosure with a two-port design, the first part consisting of an array of fixed cameras, referred to as sockets in some cases, for viewing the wide field, and a second part consisting of panable tiltable zoom (PTZ) camera to acquire detailed close-up imagery as directed by the first part, either automatically or as specified by an operator.

The primary purpose of most surveillance systems in use today is identification of people and vehicles. The two-part system described above can effectively provide video coverage of a large area, for example a parking lot or the interior of a warehouse or a campus environment, with sufficient image quality and detail for identification purposes.

U.S. Pat. No. 6,213,519 discloses such a surveillance system having a first and second image collection devices, with the second being guided by the first device and mounted within a common framework. At least one known commercial video surveillance system, which is disclosed in European Patent Specification EP 1,579,399 B1, includes a compound camera assembly including eight video camera mounted in a single housing and including a PTZ camera to cover a hemispherical or semi-hemispherical field of view.

Camera designs disclosed in the above references utilize a combination of sockets (for the reference cameras) covering the wide field and a single PTZ type camera to provide zoom guided by software control. The camera assembly is typically held within a common enclosure to provide a fixed geometric calibration framework and also protect the system from the environment.

The construction of camera designs with multiple sockets is complex and costly and presents multiple failure modes when such systems are installed outdoors and exposed to the elements. Thus, there is a need for improved cameras and associated surveillance systems.

SUMMARY OF THE INVENTION

In view of the above, in one aspect, the invention provides a simplified, robust compound camera with improved optical performance when compared to existing designs. In particular, according to the first aspect, the present invention provides a camera assembly having a two-part design with a first part comprising an array of fixed position cameras working in conjunction with a PTZ camera, where the entire assembly is enclosed by an integrated compound viewing cover.

In one aspect, a camera assembly is disclosed that includes a panable, tiltable zoom (PTZ) camera, and a plurality of fixed cameras, at least one of which has an adjustable tilt, where the fixed cameras are positioned around the PTZ camera. The camera assembly further includes a common compound viewing cover (herein also referred to as a viewing dome) through different portions of which the PTZ camera and the fixed cameras are capable of receiving visible radiation from a field of view. As discussed below, in many embodiments, the common viewing dome is formed of two separated pieces that are coupled to one another using a variety of techniques.

In some embodiments, the fixed cameras are employed to provide a wide field of view reference through a collection of individually adjustable cameras to yield the dynamic coverage of a viewing area for objects or locations of most interest to a user.

The PTZ camera can be, in turn, tiltable on a horizontal axis and rotatable about a vertical axis and can also include a variable zoom. The PTZ camera can be oriented into specific regions of interest as guided by the fixed cameras, either manually by an operator or automatically via software control, for example based on detecting motion, in a manner known in the art.

In some embodiments, the compound viewing cover of the camera assembly is arranged to enclose various components of the camera assembly (e.g., the fixed and PTZ cameras). In some embodiments, the compound cover can comprise a first section and a second section that are interlocked with one another, where the first section comprises a hemispherical dome and the second section comprises a portion of a larger-diameter hemispherical dome. In other words, the second section is in the form of a larger-diameter hemisphere with a cut-out.

In some embodiments, the second section (also referred to herein in some embodiments as the upper section) of the compound cover is aligned with the optical axis of the fixed cameras yielding a low distortion view port. In other words, an extension of the optical axis of each of the fixed cameras intersects the center of a truncated hemisphere, a portion of which comprises the second section.

In some embodiments, the first section (also referred to herein in some embodiments as the lower section) of the compound cover is aligned with the optical axis of PTZ camera providing a distortion free hemispherical view port. In other words, the optical axis of the PTZ camera passes through the center of the hemisphere forming the first section of the cover.

In some embodiments, the upper section has a larger diameter than the lower section, which is coupled to the upper section.

The lower and the upper sections can be coupled using a variety of techniques. For example, they can be thermally fused or adhesively bonded to one another. Alternatively, they can be mechanically coupled to one another using a gasket and a set of screws or any combination, with examples not intended to be limiting.

In general, the different sections of the compound viewing dome can be formed of the same material or different materials having different optical and/or absorption characteristics, particularly in the visible range of the electromagnetic spectrum. For example, in some embodiments, the entire compound dome is formed of a material that is transparent to visible radiation. In other embodiments, one section of the compound dome (e.g., The upper section) can be partially opaque to visible radiation and the other section (e.g., the lower section) can be transparent to visible radiation.

The compound viewing cover of the camera assembly provides a number of advantages. For example, as noted above, the two sections of the viewing cover can be constructed of different materials having unique optical reflection or absorption characteristics. For example, the first or second sections (or both) can be fully transparent or partially opaque to some degree. This may enhance image contrast in certain lighting conditions or selectively disguise the count or orientation of cameras inside the assembly.

Further, in some embodiments, a heating mechanism (e.g., a heating coil) can be advantageously installed at the junction of the the upper and lower sections. The heating mechanism functions to defrost and/or prevent condensation on the transparent view port in low temperature conditions.

DETAILED DESCRIPTION

The present invention will now be described with additional detail and in reference to the included drawings which exhibit one exemplary embodiment. The drawings, however, are not intended as limiting and many other variations, forms, shapes and embodiments are conceivable under this invention; rather this embodiment is provided as an example to convey the salient features of this invention to those skilled in the art.

Figure 1:
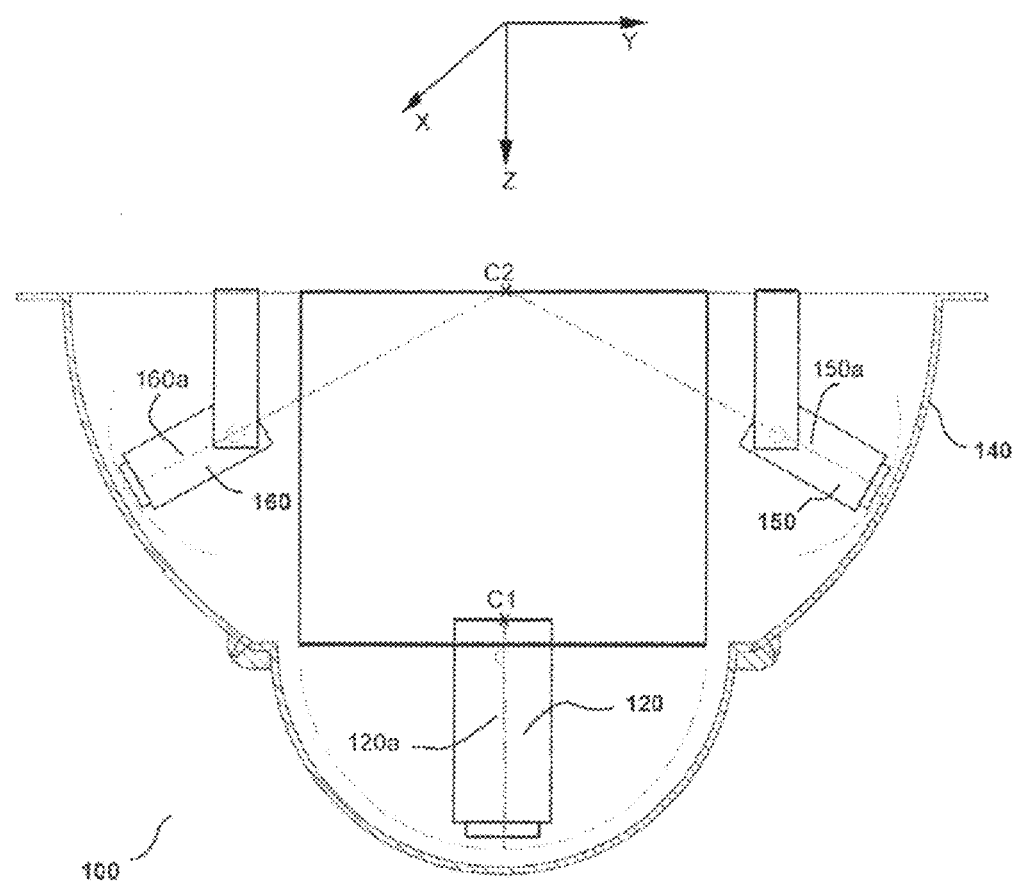
FIG. 1 is a schematic side view of an embodiment of a camera assembly according to the teachings of this invention.

FIG. 1 is a schematic side view of an embodiment of a camera assembly 100, according to the teachings of the invention, which comprises an array of fixed cameras, for example cameras 150 and 160, that are positioned around (e.g., on the perimeter) of a PTZ camera 120, where the entire assembly of the fixed cameras as well as the PTZ camera is enclosed by a compound dome cover 140. In other words, the camera assembly 100 is a multi-part system having at least the following three parts; (a) one or more fixed cameras, (b) a PTZ camera, and (c) a compound viewing cover that allows the fixed cameras and the PTZ camera to concurrently receive image data from an external environment. The fixed cameras 150 and 160 can be tilted to be oriented in a desired orientation and held fixedly in that orientation during use.

Figure 3:
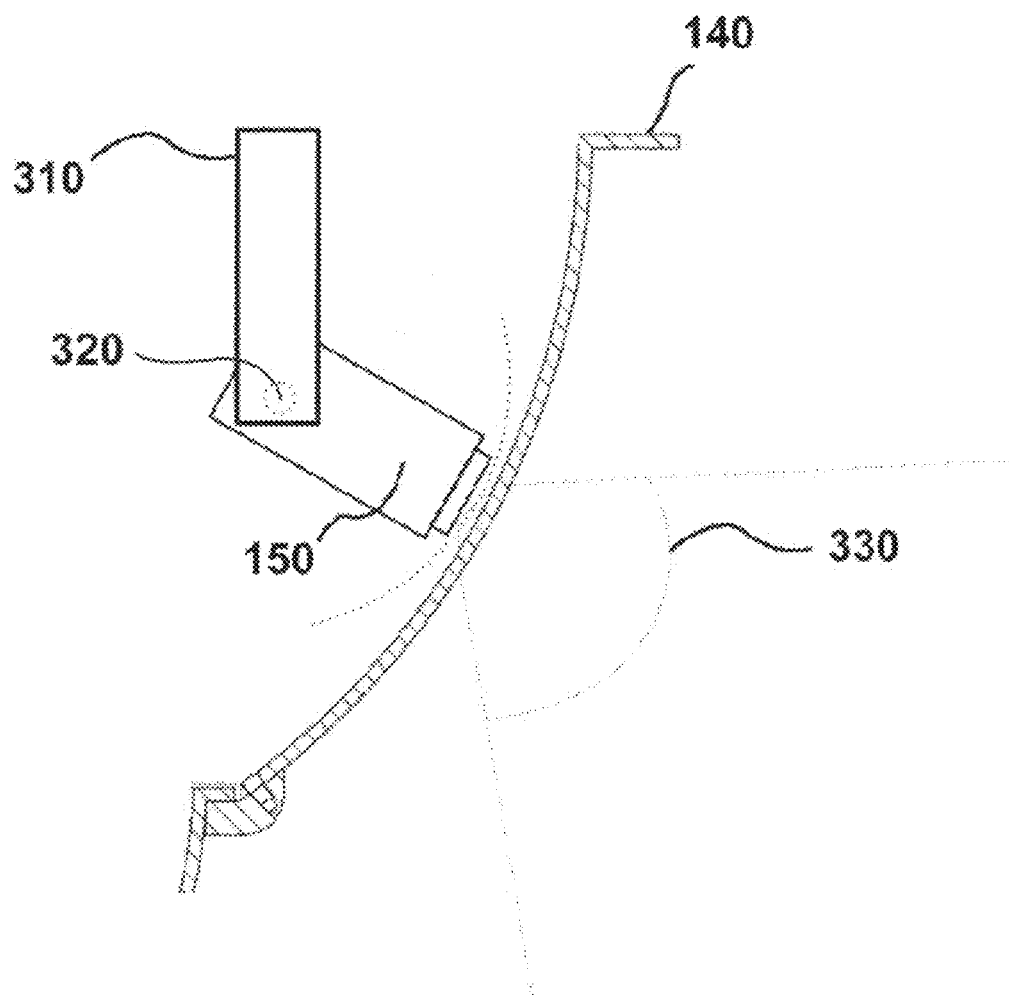
FIG. 3 is another detailed sectional view of another portion of the cross sectional view provided in FIG. 1.

FIG. 3 illustrates that in this embodiment, one of the fixed position cameras 150 is secured by a mount 310 within the enclosure 100 and has adjustable tilt about a horizontal axis 320 (in this description, a vertical axis is assumed to run along the length of the PTZ camera (e.g., z-axis shown in FIG. 1) and two horizontal axes are perpendicular to the vertical axis and to one another (e.g., x and y axes shown in FIG. 1)). The camera 150 has a field of view 330 determined by the focal length of the camera. The other fixed position camera 160 can be similarly mounted on its respective mount and can have adjustable tilt about the horizontal axis 320. The multiple reference cameras can collectively yield the dynamic coverage of a viewing area for objects or locations of most interest to the operator through individual adjustments of each reference camera to best cover a portion of the overall field of view. Such adjustments can be performed manually, for example during installation, or remotely through electromechanical actuators.

Figure 2:
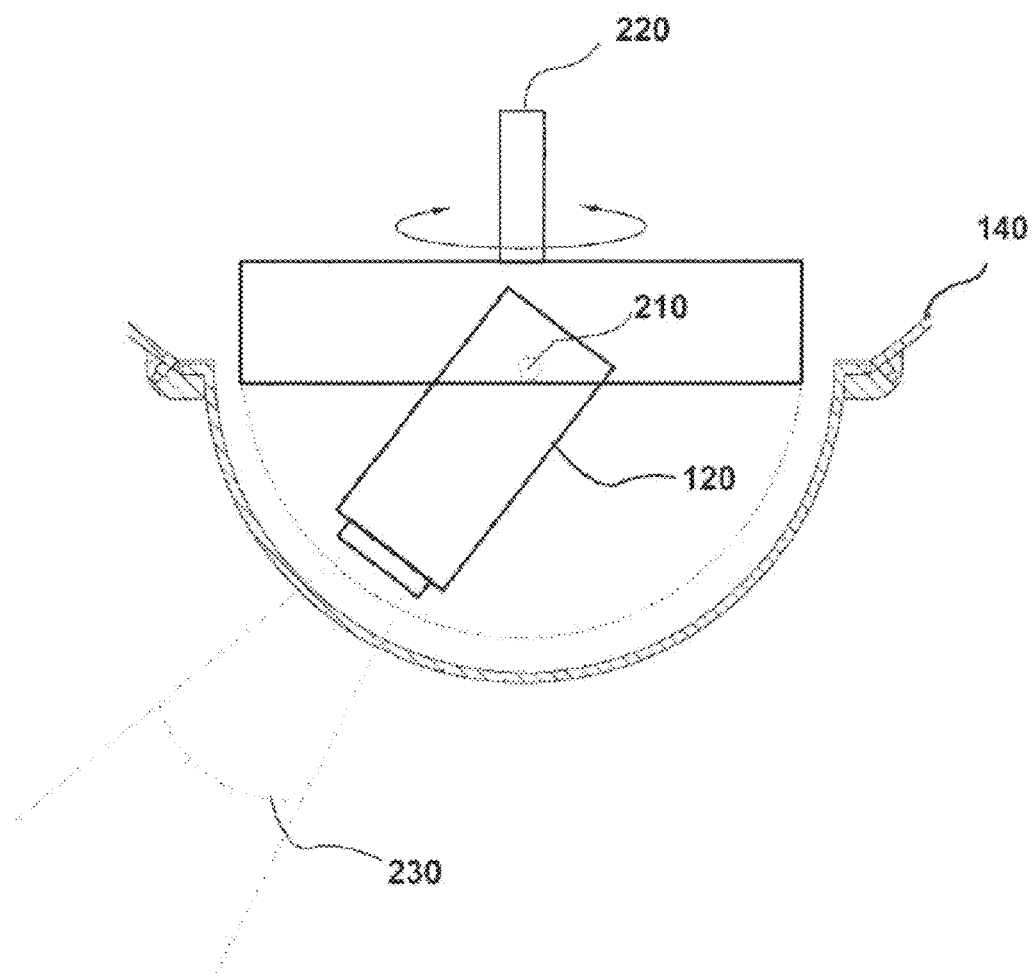
FIG. 2 is a detailed sectional view of of a portion of the cross sectional view of the camera assembly provided in FIG. 1.

FIG. 2 illustrates that the PTZ camera 120 is tiltable about a horizontal axis 210 and rotatable about a vertical axis 220 and includes a variable zoom for adjusting the field of view 230. The camera system 100 can be designed to include multiple PTZ cameras in a single enclosure in some embodiments.

The PTZ camera 120 is oriented into sub-regions of interest guided by imagery provided by the fixed position cameras, for example, camera 150 or 160. The reference cameras can serve to automatically guide the PTZ camera, for example based on movement of a person or vehicle, to select portions of the wide field of view for inspection.

Figure 4A:
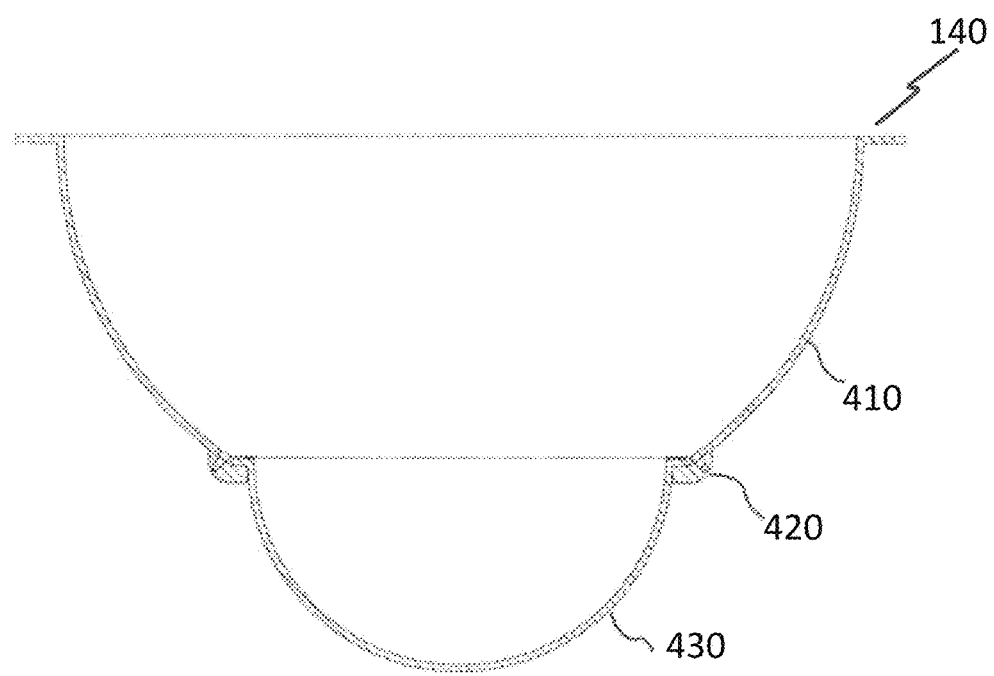
FIG. 4A is a cross-sectional view of an embodiment of a compound viewing dome for use in a camera assembly according to the teachings of the invention.

The transparent compound cover 140 illustrated in FIG. 4A encloses the lower half of the camera assembly 100 in this embodiment and comprises two sections 410 and 430. In this embodiment, the upper section 410 of the transparent cover is aligned with the optical axis of at least one of the fixed cameras, for example 150, (and it is preferably aligned with optical axes of both cameras 150 and 160) presenting a low distortion view port as illustrated in FIG. 3. The lower section 430 of the transparent cover 140 is aligned with the optical axis 120a of the PTZ camera 120 presenting an optically coherent hemispherical view port. In other words, an extension of the optical axes of the cameras 150 and 160 passes through the center C2 of the truncated hemisphere forming the upper section, and an extension of the optical axis of the PTZ camera 120 passes through the center C1 of the lower hemisphere (sec FIG. 1).

In this embodiment, the upper section 410 has a larger diameter than the lower section 430, which is coupled to the upper section 410. Other embodiments may for example couple two, three or more domes to the upper section.

In this embodiment, the lower section 430 and upper section 410 may be joined using a variety of techniques. For example, in this embodiment, the upper and the lower sections are joined mechanically using an adaptor ring 420 and screws 450 (see FIG. 4B) and weather sealed by employing thermal fusing, adhesive bonds or gaskets, or any combination, with examples in this embodiment not intended to be limiting and describing only a single PTZ.

The sectional view cover 140 provides a number of advantages. For example, individual sections can be constructed of different materials having unique optical reflection or absorption characteristics. By way of example, the upper section 410 can be semi-transparent to visible radiation, for example timed, and the lower section 430 (i.e., the PTZ view cover) can be transparent to visible radiation or vice versa or any combination. This is advantageous in selectively disguising the count and/or orientation of cameras inside the assembly 100 or enhancing optical contrast for certain wavelengths of lights or illumination conditions.

Further, in some embodiments constructing the compound dome cover 140 from two separate pieces obviates the need for costly injection molds and the difficulties (e.g., optical distortion) that can happen when heal extruding a sheet of transparent material to construct a single piece cover.

Figure 4B:
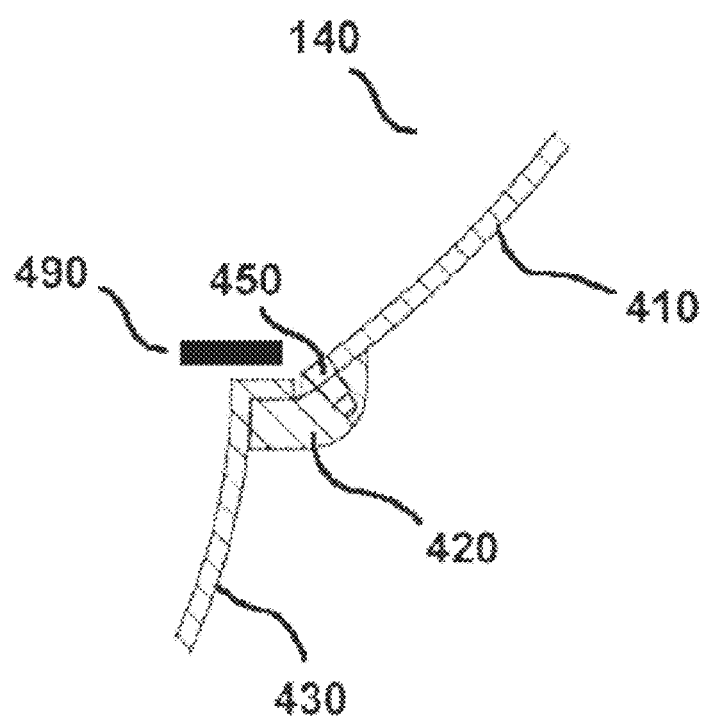
FIG. 4B is a cross-sectional view of a coupling junction between two sections of a viewing dome according to an embodiment of the invention.

In some embodiments, the intersection region of the upper and lower sections also provides an advantageous location for installing a heating coil 490 with the cross section and example of placement location shown in FIG. 4B. The heating coil in the system 100 can function to defrost and prevent condensation on the transparent view port 140 in low temperature conditions.

Those having ordinary skill in the art will appreciate that various changes can be made to the above embodiments without departing from the scope of the invention.

The invention claimed is:

1. A camera assembly comprising:
 a panable, tiltable zoom (PTZ) camera;
 a plurality of fixed cameras, at least one of which having an adjustable tilt, said fixed cameras positioned on a perimeter of the PTZ camera; and
 a transparent common compound viewing cover through which said PTZ camera and said fixed cameras are capable of receiving visible radiation from a field of view, the compound viewing cover comprising at least a first section and a second section, the first section being configured to align with an optical axis of the PTZ camera and the second section being configured to align with an optical axis of at least one of the fixed cameras;
 wherein the first section and the second section are coupled via a mechanical connection and the mechanical connection comprises screws, a weather sealed coupling employing thermal fusing, an adhesive bond, or a combination thereof.

2. The camera assembly of claim 1, wherein the plurality of fixed cameras comprises an array of fixed cameras.

3. The camera assembly of claim 1, wherein at least one of the plurality of fixed cameras is secured by a mount and wherein at least one of the plurality of fixed cameras is configured to have an adjustable tilt about a horizontal axis.

4. The camera assembly of claim 1, wherein the PTZ camera is tiltable about a horizontal axis and rotatable about a vertical axis.

5. The camera assembly of claim 1, further including a plurality of PTZ cameras enclosed within the common compound viewing cover.

6. The camera assembly of claim 1, wherein the second section is configured to be larger in diameter than the first section.

7. The camera assembly of claim 1, wherein at least one section of the common compound viewing cover is semi-transparent.

8. The camera assembly of claim 1, wherein the common compound viewing cover comprises a heating coil.

\* \* \* \* \*